(12) United States Patent
Lee et al.

(10) Patent No.: US 9,424,638 B2
(45) Date of Patent: Aug. 23, 2016

(54) APPARATUS AND METHOD FOR ANALYZING MEDICAL IMAGE

(71) Applicant: Samsung Electronics Co., Ltd., Suwon-si (KR)

(72) Inventors: Jae-Cheol Lee, Seoul (KR); Kyoung-Gu Woo, Seoul (KR); Yeong-Kyeong Seong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 139 days.

(21) Appl. No.: 14/050,900

(22) Filed: Oct. 10, 2013

(65) Prior Publication Data

US 2014/0105474 A1   Apr. 17, 2014

(30) Foreign Application Priority Data

Oct. 12, 2012   (KR) .......................... 10-2012-0113747

(51) Int. Cl.
   *G06T 7/00*    (2006.01)
(52) U.S. Cl.
   CPC .............. *G06T 7/0012* (2013.01); *G06T 7/0028* (2013.01); *G06T 2207/10081* (2013.01); *G06T 2207/10088* (2013.01); *G06T 2207/10132* (2013.01); *G06T 2207/30004* (2013.01)
(58) Field of Classification Search
   None
   See application file for complete search history.

(56) References Cited

U.S. PATENT DOCUMENTS

| | | | | |
|---|---|---|---|---|
| 5,881,124 A | * | 3/1999 | Giger | G06T 7/0012 250/363.04 |
| 6,587,598 B1 | * | 7/2003 | Devillers | A61B 6/5241 382/130 |
| 8,160,357 B2 | * | 4/2012 | Akinyemi | G06T 7/0081 128/922 |
| 8,396,268 B2 | * | 3/2013 | Zabair | G06K 9/00 128/922 |
| 2004/0047518 A1 | * | 3/2004 | Tiana | G06T 5/50 382/284 |
| 2009/0060300 A1 | | 3/2009 | Neemuchwala et al. | |
| 2010/0061601 A1 | * | 3/2010 | Abramoff | G06K 9/00617 382/117 |
| 2011/0004059 A1 | * | 1/2011 | Arneson | A61B 1/00041 600/109 |
| 2011/0249875 A1 | * | 10/2011 | Dewaele | G06T 3/0068 382/128 |
| 2011/0292462 A1 | * | 12/2011 | Yamanaka | G06K 15/1867 358/448 |
| 2012/0078097 A1 | | 3/2012 | Wang et al. | |
| 2012/0166211 A1 | * | 6/2012 | Park | G06Q 50/22 705/2 |
| 2013/0172739 A1 | * | 7/2013 | Paladini | A61B 6/4258 600/436 |

FOREIGN PATENT DOCUMENTS

| | | |
|---|---|---|
| KR | 10-0719350 B1 | 5/2007 |
| KR | 10-2008-0069307 A | 7/2008 |
| KR | 10-1028365 B1 | 4/2011 |

OTHER PUBLICATIONS

S Bhosale, A Aphale, I Macwan, M Faezipour, P Bhosale, and P Patra, "Computer assisted detection of liver neoplasm (CADLN)," Conf Proc IEEE Eng Med Biol Soc. 2012;2012:1510-3. doi: 10.1109/EMBC.2012.6346228.*

* cited by examiner

*Primary Examiner* — Matthew Bella
*Assistant Examiner* — Soo Shin
(74) *Attorney, Agent, or Firm* — NSIP Law

(57) ABSTRACT

An apparatus for analyzing a medical image includes an image receiving unit configured to receive two or more medical images from a medical device; a image registration unit configured to register the two or more received medical images; an overlapped area detecting unit configured to detect overlapped areas in the two or more registered medical images; and a lesion analyzing unit configured to analyze lesions in the two or more registered medical images by employing different analysis techniques in the detected overlapped areas.

27 Claims, 8 Drawing Sheets

APPARATUS AND METHOD FOR ANALYZING MEDICAL IMAGE

CROSS-REFERENCE TO RELATED APPLICATIONS

This application claims the benefit under 35 USC 119(a) of Korean Patent Application No. 10-2012-0113747 filed on Oct. 12, 2012, the disclosure of which is incorporated herein by reference in its entirety for all purposes.

BACKGROUND

1. Field

The following description relates to an apparatus and a method for analyzing an medical image.

2. Description of the Related Art

Computer Aided Diagnosis or Computer Aided Detection (CAD) has been developed dramatically in recent years, and diseases are now diagnosed in various areas using CAD. CAD is used to analyze a lesion using an image received from an ultrasound probe by detecting a lesion, extracting features, and classifying. Using CAD, features of an image are extracted and analyzed in various ways, leading to heavy image processing loads. In addition, as three-dimensional (3D) CAD requires a large amount of data to be received, a highly efficient workflow is essential to analyze an image.

SUMMARY

In one general aspect, an apparatus for analyzing a medical image includes an image receiving unit configured to receive two or more medical images from a medical device; a image registration unit configured to register the two or more received medical images; an overlapped area detecting unit configured to detect overlapped areas in the two or more registered medical images; and a lesion analyzing unit configured to analyze lesions in the two or more registered medical images by employing different analysis techniques in the detected overlapped areas.

The apparatus may further include a result display unit configured to display the registered medical images and analysis results obtained by the lesion analyzing unit on a screen.

The image receiving unit may be further configured to sequentially receive the two or more medical images from the medical device.

The overlapped area detecting unit may be further configured to detect the overlapped areas based on coordinate information received from the medical device and corresponding to each of the two or more medical images.

The overlapped area detecting unit may be further configured to detect the overlapped areas based on information about a measurement range of each of the two or more medical images measured by the medical device, and information about a moving distance of the medical device.

The overlapped area detecting unit may be further configured to measure a similarity level between the two or more medical images based on structural feature information of the two or more medical images, and detect the overlapped areas based on the measured similarity level.

The overlapped area detecting unit may be further configured to generate one or more cluster objects by clustering objects included in each of the two or more medical images, and extract the structural feature information from the generated one or more cluster objects.

The structural feature information may be distribution information of the cluster objects, or graphs in which objects in the cluster objects are connected to one another.

The different analysis techniques may include analyzing the two or more medical images except for detected overlapped areas included in at least some of the two or more medical images when a similarity level of the detected overlapped areas are greater than a predetermined reference level.

The different analysis techniques may include analyzing detected overlapped areas included in at least some of the two or more medical images using different analysis algorithms according to a similarity level of the detected overlapped areas, or using a same algorithm for a different number of features, compared to an algorithm used for non-overlapped areas of the two or more medical images.

The different analysis techniques may include analyzing the two or more medical images except for detected overlapped areas included in at least some of the two or more medical images.

The different analysis techniques may include analyzing detected overlapped areas included in at least some of the two or more medical images using different analysis algorithms, or using a same algorithm for a different number of features, compared to an algorithm used for non-overlapped areas of the two or more medical images.

In another general aspect, a method of analyzing a medical image includes receiving two or more medical images from a medical device; registering the two or more received medical images; detecting overlapped areas in the two or more registered medical images; and analyzing lesions in the two or more registered medical images by employing different analysis techniques in the detected overlapped areas.

The method may further include displaying the registered medical images and analysis results obtained by the analyzing of the lesions on a screen.

The receiving of the two or more medical images may include sequentially receiving the two or more medical images from the medical device.

The detecting of the overlapped areas may include detecting the overlapped areas based on coordinate information received from the medical device and corresponding to each of the medical images.

The detecting of the overlapped areas may include detecting the overlapped areas based on information about a measurement range of each of the two or more medical images measured by the medical device, and information about a moving distance of the medical device.

The detecting of the overlapped areas may include measuring a similarity level between the two or more medical images based on structural feature information of the two or more medical images; and detecting the overlapped areas based on the measured similarity level.

The detecting of the overlapped areas may further include generating one or more cluster objects by clustering objects included in each of the two or more medical images; and extracting the structural feature information from the generated one or more cluster objects.

The structural feature information may include distribution information of the cluster objects, or graphs in which objects in the cluster objects are connected to one another.

The different analysis techniques may include analyzing the two or more medical images except for the detected overlapped areas included in at least some of the two or more medical images when a similarity level of the detected overlapped areas is greater than a predetermined reference level.

The different analysis techniques may include analyzing the detected overlapped areas included in at least some of the two or more medical images using different analysis algorithms according to a similarity level of the detected overlapped areas, or using a same algorithm for a different number of features, compared to an algorithm used for non-overlapped areas of the two or more medical images.

The different analysis techniques may include analyzing the two ore more medical images except for the detected overlapped areas included in at least some of the two or more medical images.

The different analysis techniques may include analyzing the detected overlapped areas included in at least some of the two or more medical images using different analysis algorithms, or using a same algorithm for a different number of features, compared to an algorithm used for non-overlapped areas of the two or more medical images.

In another general aspect, a method of analyzing a medical image includes receiving a first medical image and a second medical image that partially overlaps the first medical image from a medical device; analyzing the first medical image for lesions by employing a first analysis technique; and analyzing a portion of the second medical image that overlaps the first medical image for lesions by employing a second analysis technique different from the first analysis technique.

The method may further include analyzing a remaining portion of the second medical image excluding the portion of the second medical image that overlaps the first medical image for lesions using the first analysis technique.

The method may further include selecting the second analysis technique from a plurality of different analysis techniques based on a level of similarity between a portion of the first medical image that is overlapped by the second medical image and the portion of the second medical image that overlaps the first medical image.

Other features and aspects will be apparent from the following detailed description, the drawings, and the claims.

DETAILED DESCRIPTION

Figure 1:
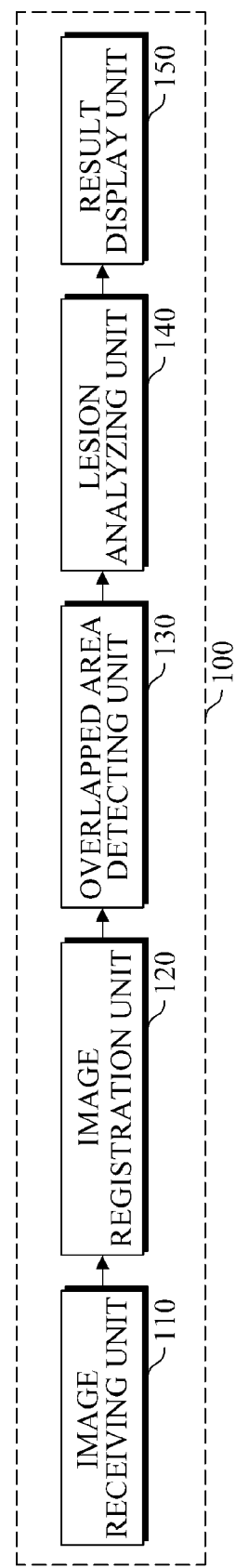
FIG. 1 is a block diagram illustrating an example of an apparatus for analyzing a medical image.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Figure 2:
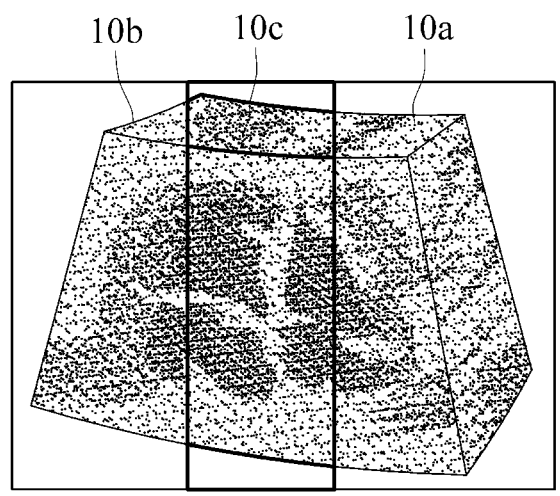
FIG. 2 is a diagram illustrating an example of medical images overlapping each other.

FIG. 1 is a diagram illustrating an example of an apparatus for analyzing a medical image. FIG. 2 is a diagram illustrating an example of medical images overlapping each other.

Referring to FIG. 1, an apparatus 100 for analyzing a medical image includes an image receiving unit 110, an image registration unit 120, an overlapped area detecting unit 130, and a lesion analyzing unit 140.

Referring to FIG. 2, the image receiving unit 110 receives two or more medical images 10a and 10b from a medical device. The medical device is a device that measures a patient's affected body part, outputs the measurement result in the form of an electrical signal, and converts the electrical signal into an image. Examples of the medical device include an ultrasound detector, a Magnetic Resonance Imaging (MRI) device, and a Computed Tomography (CT) device. The output electrical signals are converted into images in a consecutive form, and then transmitted to the image receiving unit 110 in real time. That is, the image receiving unit 110 may sequentially receive medical images in a consecutive manner from a medical device in real time.

The image registration unit 120 registers the received medical images. Various well-known techniques for analyzing a medical image may be used in the image registration unit 120. Image registration is a process of transforming different sets of coordinates of data into one set of coordinates, since scenes or objects photographed at different times or from different viewpoints may have different sets of coordinates. Image registration is used to match an image photographed at a certain time or from a certain viewpoint with another image photographed at a different time or from a different viewpoint.

The overlapped area detecting unit 130 detects an overlapped area in the registered medical images. Referring to FIG. 2, two medical images 10a and 10b, which are obtained by and received from a medical device, have an overlapped area 10c. If the medical images 10a and 10b are analyzed to analyze a lesion without taking into account the overlapped area 10c, analysis is performed on the overlapped area 10c twice, slowing down an analysis process. In particular, since a three-dimensional (3D) medical image has an enormous amount of data, it may be much slower to analyze the 3D medical image.

The overlapped area detecting unit 130 may detect the overlapped area 10c in the medical images 10a and 10b in various ways. For example, the overlapped area detecting unit 130 may detect the overlapped area 10c based on coordinate information of each of the medical images 10a and 10b. That is, the overlapped area 10c can be detected by comparing coordinates from the previously-received medical image 10a and the following medical image 10b in a sequence of medical images. In this case, it can be concluded that the similarity level of the detected overlapped area 10c is 100%. That is, the similarity level between a portion of the medical image 10a in the detected overlapped area 10c and a portion of the medical image 10b in the detected overlapped area 10b is 100%. Both a medical image and coordinate information thereof may be received from a medical device.

Figure 3:
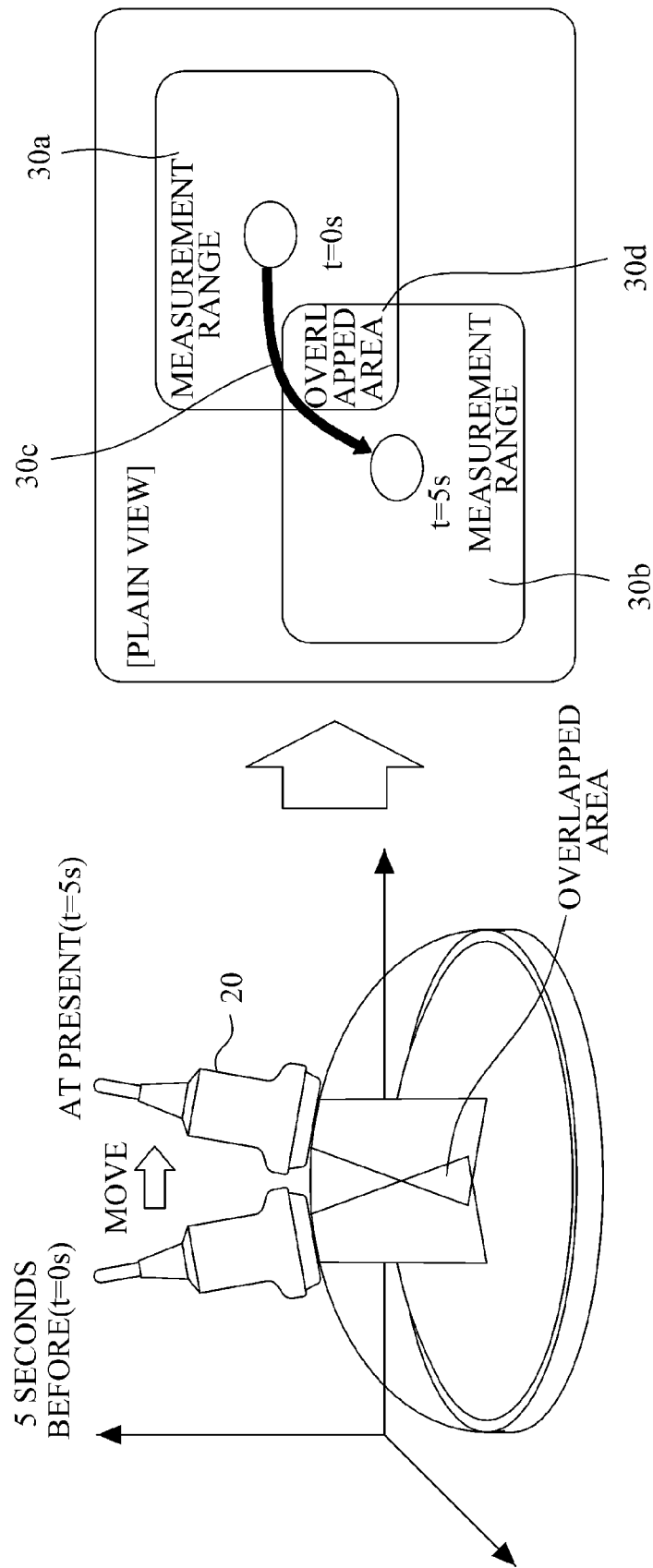
FIG. 3 is a diagram illustrating an example of detecting an overlapped area.

FIG. 3 is a diagram illustrating an example of detecting an overlapped area. Referring to FIGS. 1 and 3, the overlapped area detecting unit 130 may detect an overlapped area 30d based on information about measurement ranges 30a and 30b of the two medical images detected by a medical device 20 and information about a moving distance 30c of the medical device 20. The information about the moving distance may include a moving direction of the medical device 20 and a distance that the medical device 20 was physically moved.

Suppose that the medical device 20 generates the first medical image by measuring a patient's affected body part five seconds before (t=0 s) the present, and the second medical image by moving a predetermined distance and then measuring the affected body part at present (t=5 s). In this case, an overlapped area 30d may be detected by finding out where the first medical image and the second medical image overlap each other based on the measurement range 30a of the first medical image and the measurement range 30b and the moving distance 30c of the second medical image.

Figure 4A:
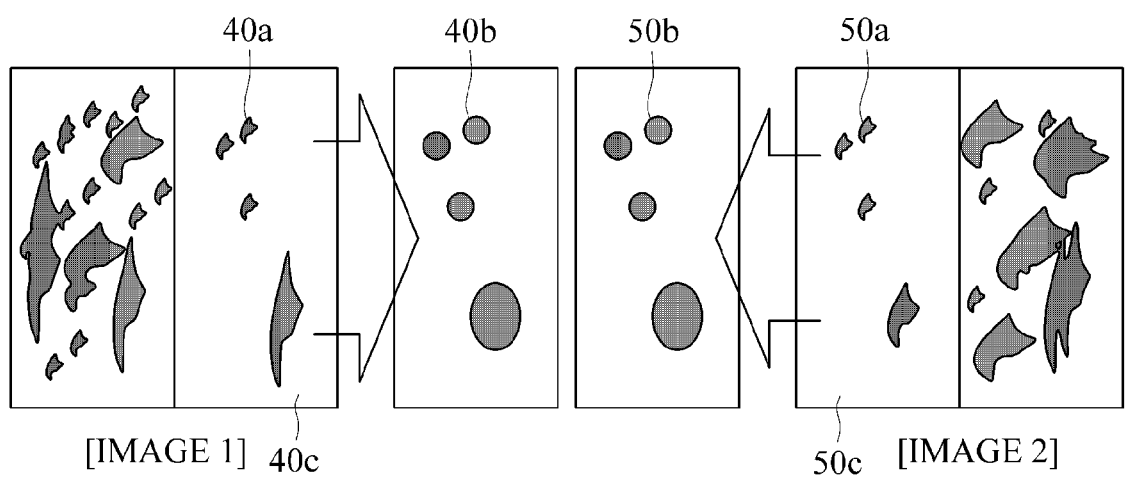
FIGS. 4A and 4B are diagrams illustrating other examples of detecting an overlapped area.
Figure 4B:
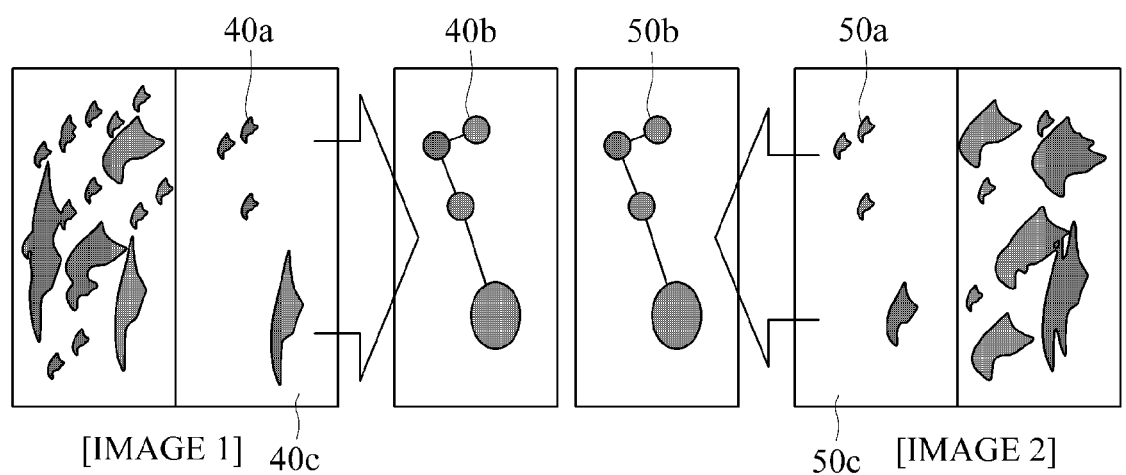

FIGS. 4A and 4B are diagrams illustrating other examples of detecting an overlapped area. Referring to FIGS. 4A and 4B, the overlapped area detecting unit 130 may measure a similarity level between received medical images based on structural feature information thereof, and an overlapped area may be detected based on the similarity level. When there is no accurate coordinate information about received medical images, the overlapped area detecting unit 130 may detect an overlapped area by measuring a similarity level between the received medical images.

FIG. 4A is a diagram illustrating an example of measuring a similarity level between two medical images based on distribution information of objects included in each of the medical images. That is, the overlapped area detecting unit 130 may extract distribution information of objects included in each of medical images 1 40c and 2 50c, and then measure a similarity level of a distribution of the objects using Discriminatively Trained Part Based Models (DPM).

The overlapped area detecting unit 130 may cluster two or more objects included in the medical images 1 40c and 2 50c according to intensity or shape. FIG. 4A shows cluster results 40a and 50a. The cluster result 40a is a group of two or more objects with similar intensities or shapes, and the cluster result 50a is a group of two or more objects with similar intensities or shapes. The overlapped area detecting unit 130 simplifies the cluster results 40a and 50a of the medical images 1 40c and 2 50c to generate corresponding cluster objects 40b and 50b. The overlapped area detecting unit 130 extracts distribution information of the cluster objects 40b and 50b, and measures a similarity level between the medical images 1 40c and 2 50c based on the distribution information.

FIG. 4B is a diagram illustrating an example of measuring a similarity level between two medical images based on graphic information of objects. That is, the overlapped area detecting unit 130 may display a graph for each of the medical images 1 40c and 2 50c by connecting together objects in each of the medical images 1 40c and 2 50c, and measure a similarity level between the graphs using an edit distance algorithm.

As described above with reference to FIG. 4A, the overlapped area detecting unit 130 may cluster two or more objects included in each of the medical images 1 40c and 2 50c according to intensity or shape, and simplify the cluster results 40a and 50a to generate cluster objects 40b and 50b corresponding to the cluster results 40a and 50a. In addition, the overlapped area detecting unit 130 may display a graph for each of the medical images 1 40c and 2 50c by connecting each object in each of the cluster objects 40b and 50b to the nearest object in the same cluster object, and detect an overlapped area by measuring a similarity level between the graphs displayed in the above manner.

If a similarity level of an area is found to be higher than a predetermined reference level (for example, 50%), the overlapped area detecting unit 130 determines that the area is an overlapped area. Each medical image may include a plurality of overlapped areas according to a predetermined reference level of similarity. In addition, a different analysis technique may be employed in each overlapped area according to a similarity level.

A lesion analyzing unit 140 may analyze lesions in two or more registered medical images using different analysis techniques. Specifically, the lesion analyzing unit 140 may analyze a detected overlapped area using various analysis techniques according to a predetermined criterion, thereby speeding up an analysis process.

For example, when the overlapped area detecting unit 130 detects an overlapped area based on accurate coordinate information or accurate information about a measurement range and a moving distance of a medical device, the lesion analyzing unit 140 is able to analyze medical images excluding an overlapped area in the following medical image in a sequence, thereby speeding up an analysis process. In another example, in order to avoid omission of detecting lesions in an overlapped area, the lesion analyzing unit 140 may analyze the overlapped area using an analysis algorithm different from that which is used for the non-overlapped area, or using the same analysis algorithm as that which is used for the non-overlapped area for a different number of features. That is, a previously received medical image may be analyzed using a DPM analysis algorithm, and the overlapped area in the following medical image may be analyzed using a different analysis algorithm (for example, a Region Growth algorithm) providing a fast analysis speed. Or, the overlapped area in the following medical image may be analyzed using the same analysis algorithm as that which was employed in the previously received medical image for fewer features (for example, shape, texture, brightness, and boundary).

If the overlapped area detecting unit 130 detects an overlapped area in medical images based on structural feature information of the medical images, the lesion analyzing unit 140 may analyze the detected overlapped area using different analysis techniques based on a similarity level of the medical images. If a similarity level of the overlapped area is greater than a predetermined reference level (for example, 90%), lesions in the medical images excluding the overlapped area may be analyzed. The reference level may be set in advance during a pretreatment process by deducing an optimized value of the reference level required to detect lesions in an overlapped area and to speed up an analysis process.

A group of reference levels may be set, and a different analysis technique may be employed according to each reference level. For example, four similarity levels may be set, such as similarity levels being higher than 90%, 70%, and 50%, and less than 50%. In this case, the higher a similarity level, the slower but more accurate analysis technique may be used, or the lower a similarity level, the faster but less accurate analysis technique may be used. On the other hand, if the same analysis algorithm as that which is used for the non-overlapped area is employed for a predetermined number of features of an overlapped area, an analysis process may become faster. That is, 100%, 90%, 70%, or 50% of features of an overlapped image may be analyzed if similarity levels are higher than 90%, 70%, and 50%, and less than 50%, respectively. In addition, as described above, except for other overlapped areas with a similarity level higher than 90%, overlapped areas with a similarity level less than 50% may be analyzed using the same analysis algorithm as an algorithm employed in the non-overlapped area in which medical images do not overlap each other.

Figure 5:
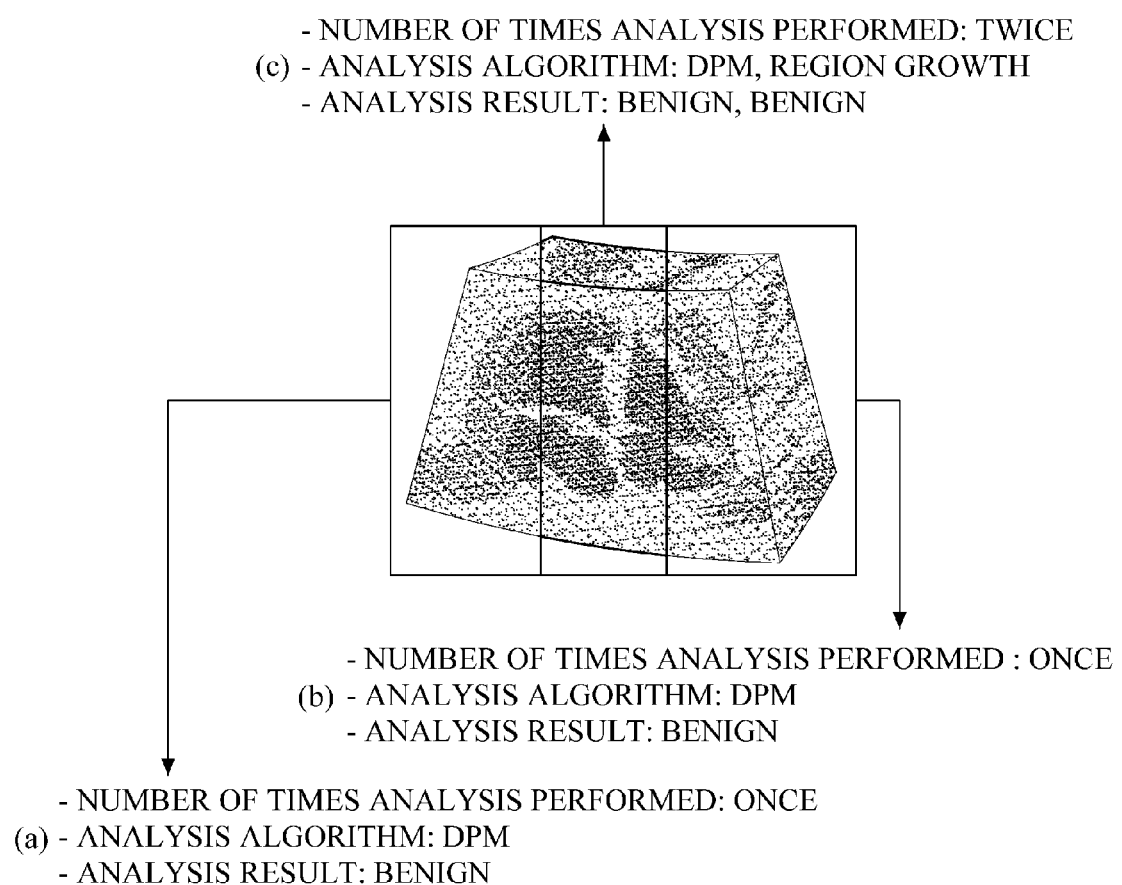
FIG. 5 is a diagram illustrating an example of an analysis result displayed on a screen.

FIG. 5 is a diagram illustrating an example of an analysis result displayed on a screen. In another example the apparatus 100 for analyzing a medical image illustrated in FIG. 1 may further include a result display unit 150 as illustrated in FIG.

1. Referring to FIGS. 1 and 5, the result display unit 150 may display an analysis result on a screen to enable a user to visually check the analysis result. In this way, user convenience may be enhanced, since the user is able to check whether an overlapped area has been analyzed, whether the analysis result is "benign" or "malignant", and the number of times that the overlapped area has been analyzed.

In FIG. 5, (a) indicates an analysis result of a non-overlapped area other than an overlapped area included in the first image, and informs a user that an algorithm used for the first image is a DPM analysis algorithm, that the first image has been analyzed once, and that the analysis result is "benign." In FIG. 5, (b) indicates an analysis result of a non-overlapped area other than an overlapped area in the second image, and informs the user that an algorithm used for the second image is a DPM analysis algorithm, that the second image has been analyzed once, and that the analysis result is "benign." In FIG. 5, (c) indicates an analysis result of an overlapped area where the first image and the second image overlap each other, and informs the user that both the first image and the second image have been analyzed once, so, in total, analysis was performed twice, that a DPM analysis algorithm and a Region Growth algorithm were used, and that both analysis results are "benign."

Figure 6:
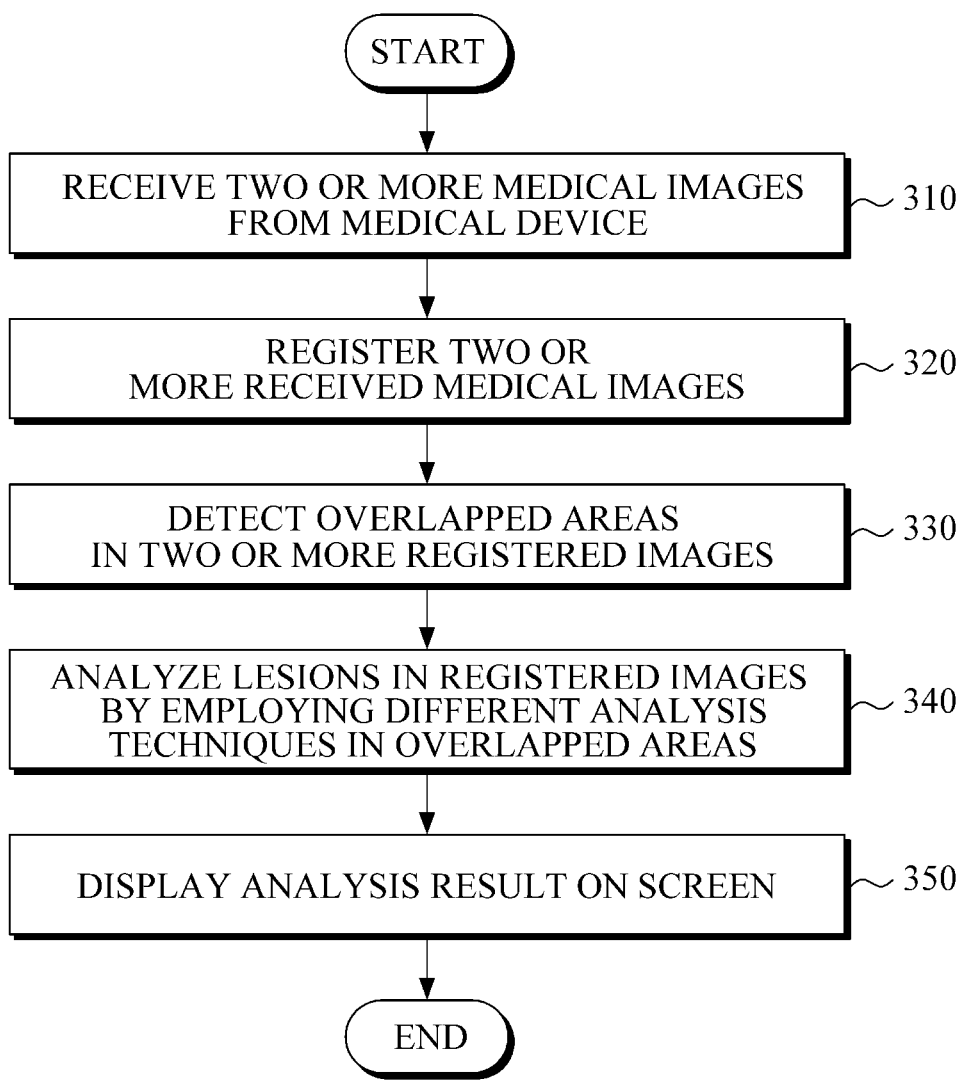
FIG. 6 is a flow chart illustrating an example of a method of analyzing a medical image.

FIG. 6 is a flow chart illustrating an example of a method of analyzing a medical image. In greater detail, FIG. 6 illustrates an example of a method of analyzing a lesion by analyzing a medical image received from the apparatus 100 for analyzing a medical image illustrated in FIG. 1.

First of all, the apparatus 100 for analyzing a medical image receives two or more medical images from a medical device in operation 310. The medical images may be captured in real time by the medical device and then continuously and sequentially received.

Next, two or more received medical images are registered in operation 320. Image registration is the process of transforming different sets of coordinates of corresponding medical images into one set, enhancing an accuracy of analysis. General registration techniques may be employed in operation 320.

Next, overlapped areas in two or more registered medical images are detected in operation 330. As described above, the overlapped areas may be detected by comparing accurate coordinate information of each of the registered medical images. The coordinate information maybe received along with a corresponding medical image from the medical device. In addition, each overlapped area may be calculated based on information about a measurement range and a moving distance of the medical device, and the information may be received together with a corresponding medical image. Meanwhile, if accurate coordinate information or accurate information about measurement ranges is not received, a similarity level between the medical images may be measured based on structural feature information thereof, and overlapped areas may be detected based on the similarity level.

Next, lesions in the registered medical images are analyzed using different analysis techniques in the detected overlapped areas in operation 340. The different analysis techniques may include analyzing the registered medical images except for an overlapped area of a following medical image in a sequence, analyzing overlapped areas using different analysis algorithms according to measured similarity levels thereof, and analyzing the overlapped areas using the same analysis algorithm for the different number of features, compared to an algorithm used for the non-overlapped area, thereby speeding up an analysis process.

Lastly, an analysis result is displayed on a screen in 350, thereby informing a user of whether each overlapped area has been analyzed, what kind of analysis algorithm was used for each medical image, the number of times that each medical image has been analyzed, and a result of the analysis.

Figure 7:
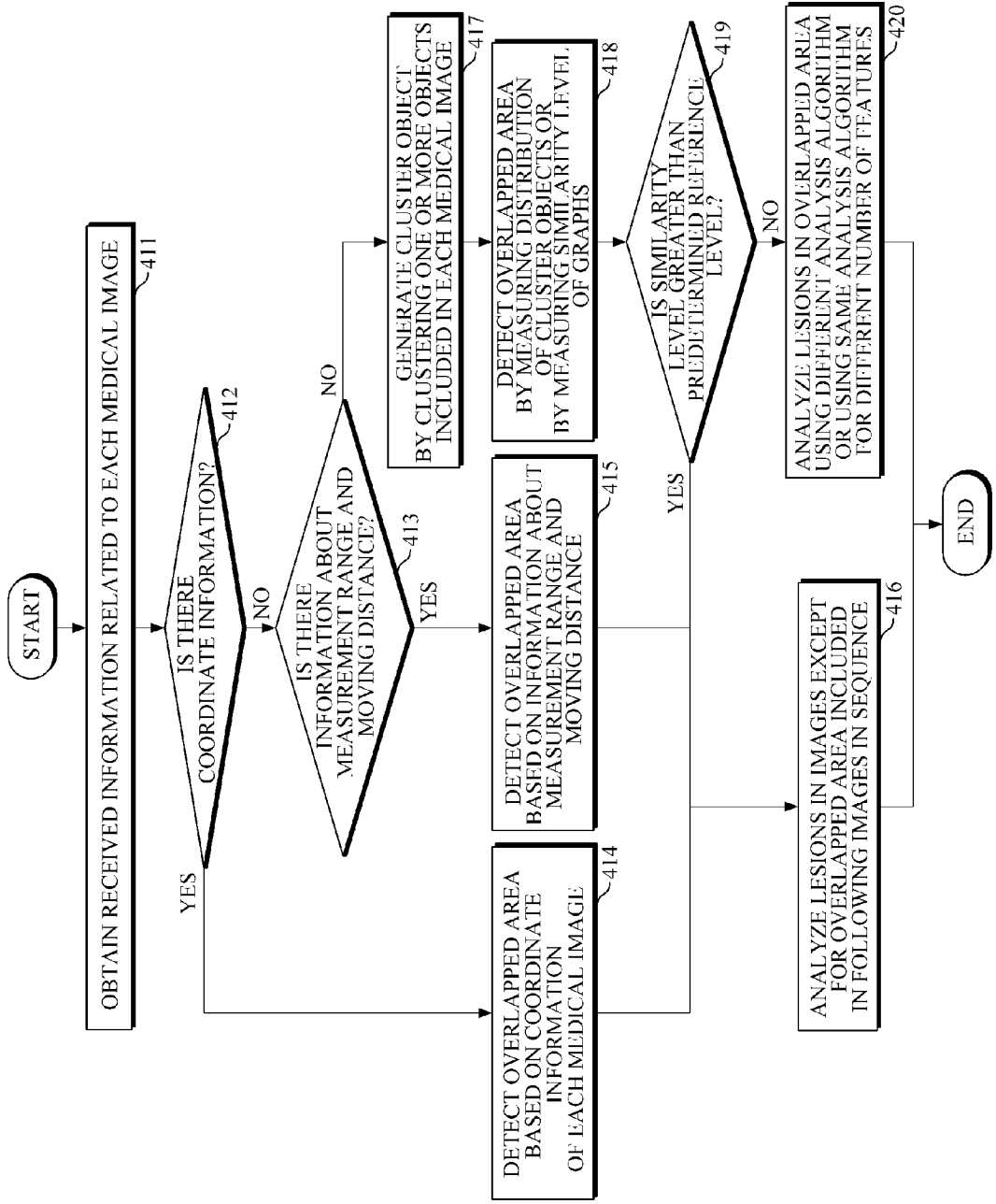
FIG. 7 is a flow chart illustrating in detail an example of the method of analyzing a medical image illustrated in FIG. 6.

FIG. 7 is a flow chart illustrating in detail an example of the method of analyzing a medical image illustrated in FIG. 6. In particular, FIG. 7 provides a more detailed description of operations 330 and 340 of FIG. 6.

First, information received along with each of registered medical images is obtained in operation 411. Whether the received information includes accurate coordinate information of each of the registered medical images is checked in operation 412. If there is accurate coordinate information of the registered medical images, an overlapped area may be detected based on the coordinate information by comparing sets of coordinates thereof. In this case, the registered medical images may have an overlapped area with a similarity level of 100%.

If accurate coordinate information is not found, whether the received information includes information about a measurement range and a moving distance of a medical device is checked in operation 413. As described above with reference to FIG. 3, if the received information includes information about a measurement range and a moving distance of a medical device, it is possible to calculate an area that corresponds to the measurement range included in the received information. If neither accurate coordinate information nor accurate information about a measurement range and a moving distance of a medical device are found, a similarity level between the registered medical images is measured, and then an overlapped area is detected based on the measured similarity level. For example, as described above with reference to FIGS. 4A and 4B, a cluster object may be generated by clustering two or more objects included in each medical image in operation 417. Next, a similarity level between the cluster objects included in each medical image may be measured based on distribution information of the cluster objects, or based on a graph in which each object in each cluster object is connected to the nearest object in the same cluster object, and then one or more overlapped areas may be detected based on the measured similarity level in operation 418.

Next, if the overlapped areas are detected, different analysis techniques are employed in the overlapped areas. For example, if an overlapped area is detected based on accurate coordinate information in operation 414 or based on accurate information about a measurement range and a moving distance of a medical device in operation 415, it is concluded that the similarity level of the overlapped area is almost 100%, and thus the medical images excluding an overlapped area of a following medical image in a sequence are analyzed in operation 416. In this case, in order to avoid omission of detecting lesions in the overlapped area, the overlapped area may be analyzed using a different analysis algorithm (for example, a less accurate but faster algorithm) or using the same algorithm for a different number of features (for example, fewer features), compared to an algorithm used for the non-overlapped area, thereby speed up an analysis process.

If an overlapped area is detected by measuring a similarity level of graphs based on structural feature information thereof in operation 418, a different analysis technique may be used in the overlapped area based on the measured similarity level. For example, if a measured similarity level of an overlapped area is determined to be greater than a predetermined reference level (for example, 90%) in operation 419, the medical images excluding the overlapped area are analyzed to analyze lesions in operation 416. In addition, as described above, if the measured similarity level of an overlapped area is determined to be less than a predetermined reference level, the overlapped area may be analyzed using a different analysis algorithm, or using the same algorithm for a different number of features, compared to an algorithm used for the other area in operation 420.

In the above examples, it was described that if there is no coordinate information or information about a measurement range and a moving distance, an overlapped area is detected based on structural feature information of corresponding medical images. However, this is merely an example, and a user may set the order of operations for detecting an overlapped area in advance according to various criteria.

The apparatus 100 and the method for analyzing a medical image described above may be applied in an automatic lesion analyzing system that employs a two-dimensional (2D) or three-dimensional (3D) medical image device. In addition, the apparatus 100 and the method for analyzing a medical image described above are able to detect overlapped areas in various ways and use a different analysis technique in each detected overlapped area. Therefore, overlapped analysis may be avoided and omission of detecting lesions may be prevented, thereby leading to a faster analysis process.

The apparatus 100 for analyzing a medical image, the image receiving unit 110, the image registration unit 120, the overlapped area detecting unit 130, the lesion analyzing unit 140, and the result display unit 150 described above that perform the operations illustrated in FIGS. 2, 3, 4A, 4B, and 5-7 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for analyzing a medical image, the apparatus comprising:
a processor configured to:
register two or more medical images received from a medical device, the two or more medical images comprising a first image and a second image;
detect, based on overlap information, overlapped areas in the first image and the second image;
analyze lesions in the first image using a first analysis technique;
analyze, using the first analysis technique, lesions in the second image excluding the overlapped areas;
select, using the overlap information, a different analysis technique; and
analyze lesions in the overlapped areas in the second image using the selected different analysis technique.

2. The apparatus of claim 1, further comprising a result display configured to display the registered medical images and analysis results obtained by the processor on a screen.

3. The apparatus of claim 1, further comprising an image receiver configured to sequentially receive the two or more medical images from the medical device.

4. The apparatus of claim 1, wherein the overlap information comprises coordinate information received from the medical device and corresponding to the first image and to the second image.

5. The apparatus of claim 1, wherein the overlap information comprises information about a measurement range of the first image and the second image measured by the medical device, and information about a distance that the medical device has moved between a first time of capture of the first image and a second time of capture of the second image.

6. The apparatus of claim 1, wherein the overlap information comprises structural feature information of the first image and the second image, and
wherein the processor is further configured to measure a similarity level between the first image and the second image based on the structural feature, and to detect the overlapped areas based on the measured similarity level.

7. The apparatus of claim 6, wherein the processor is further configured to generate one or more cluster objects by clustering objects included in the first image and the second image, and extract the structural feature information from the generated one or more cluster objects.

8. The apparatus of claim 7, wherein the structural feature information is distribution information of the cluster objects, or graphs in which objects in the cluster objects are connected to one another.

9. The apparatus of claim 6, wherein the different analysis technique comprises analyzing the first image and the second image except for detected overlapped areas included in the second image when a similarity level of the detected overlapped areas is greater than a predetermined reference level.

10. The apparatus of claim 6, wherein the measured similarity level is further used to select the different analysis technique, or to select the different analysis technique to be the first analysis technique performed for a different number of features within the overlapped areas.

11. The apparatus of claim 1, wherein the different analysis technique comprises analyzing the first image and the second image except for detected overlapped areas included in the second image.

12. The apparatus of claim 1, wherein the different analysis technique comprises analyzing the detected overlapped areas included in the second image using the first analysis technique for a different number of features.

13. A method of analyzing a medical image, the method comprising:
receiving two or more medical images from a medical device, the two or more medical images comprising a first image and a second image;
registering the two or more received medical images;
detecting, based on overlap information, overlapped areas in the first image and the second image;
analyzing lesions in the first image using a first analysis technique;
analyzing, using the first analysis technique, lesions in the second image excluding the overlapped areas;
selecting, using the overlap information, a different analysis technique; and
analyzing lesions in the overlapped areas in the second image using the selected different analysis technique.

14. The method of claim 13, further comprising displaying the registered medical images and analysis results obtained by the analyzing of the lesions on a screen.

15. The method of claim 13, wherein the receiving of the two or more medical images comprises sequentially receiving the two or more medical images from the medical device.

16. The method of claim 13, wherein the overlap information comprises coordinate information received from the medical device and corresponding to the first image and to the second image.

17. The method of claim 13, wherein the overlap information comprises information about a measurement range of the first image and the second image measured by the medical device, and information about a distance that the medical device has moved during a time between a first time of capture of the first image and a second time of capture of the second image.

18. The method of claim 13, wherein the overlap information comprises structural feature information of the first image and the second image, and
wherein detecting of the overlapped areas comprises:
measuring a similarity level between the first image and the second image based on the structural feature information; and detecting the overlapped areas based on the measured similarity level.

19. The method of claim 18, wherein the detecting of the overlapped areas further comprises:
generating one or more cluster objects by clustering objects included in the first image and the second image; and
extracting the structural feature information from the generated one or more cluster objects.

20. The method of claim 19, wherein the structural feature information comprises distribution information of the cluster objects, or graphs in which objects in the cluster objects are connected to one another.

21. The method of claim 18, wherein the different analysis technique comprises analyzing the first image and the second image except for the detected overlapped areas included in the second image when a similarity level of the detected overlapped areas is greater than a predetermined reference level.

22. The method of claim 18, wherein the measured similarity level is further used to select the different analysis technique, or the select the different analysis technique to be the first analysis technique performed for a different number of features within the overlapped areas.

23. The method of claim 13, wherein the different analysis technique comprises analyzing the first image and the second image except for the detected overlapped areas included in the second image.

24. The method of claim 13, wherein the different analysis technique comprises analyzing the detected overlapped areas included in the second image using the first analysis technique for a different number of features.

25. A method of analyzing a medical image, the method comprising:
receiving a first medical image and a second medical image that partially overlaps the first medical image from a medical device;
analyzing the first medical image for lesions by employing a first analysis technique; and
analyzing a portion of the second medical image that overlaps the first medical image for lesions by employing a second analysis technique different from the first analysis technique,
wherein the second analysis technique is selected based on overlap information used to detect the portion of the second medical image that overlaps the first medical image.

26. The method of claim 25, further comprising analyzing a remaining portion of the second medical image excluding the portion of the second medical image that overlaps the first medical image for lesions using the first analysis technique.

27. The method of claim 25, wherein the overlap information comprises a level of similarity between a portion of the first medical image that is overlapped by the second medical image and the portion of the second medical image that overlaps the first medical image, and
where the second analysis technique is selected from among a plurality of different analysis techniques based on the level of similarity.

* * * * *